(12) United States Patent
Ender et al.

(10) Patent No.: US 12,124,362 B2
(45) Date of Patent: *Oct. 22, 2024

(54) WORKLOAD GENERATION FOR OPTIMAL STRESS TESTING OF BIG DATA MANAGEMENT SYSTEMS

(71) Applicant: International Business Machines Corporation, Armonk, NY (US)

(72) Inventors: Ilker Ender, Dublin (IE); Austin Clifford, Glenageary (IE); Pedro Miguel Barbas, Dunboyne (IE); Mara Elisa de Paiva Fernandes Matias, Dublin (IE); Hemant Asandas Bhatia, Olathe, KS (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,688

(22) Filed: Jun. 21, 2023

(65) Prior Publication Data
US 2023/0333971 A1 Oct. 19, 2023

Related U.S. Application Data

(63) Continuation of application No. 17/492,255, filed on Oct. 1, 2021, now Pat. No. 11,741,001.

(51) Int. Cl.
*G06F 9/44* (2018.01)
*G06F 11/07* (2006.01)
(Continued)

(52) U.S. Cl.
CPC ...... *G06F 11/3688* (2013.01); *G06F 11/0772* (2013.01); *G06F 11/3414* (2013.01); *G06F 11/3692* (2013.01)

(58) Field of Classification Search
CPC ............ G06F 11/3688; G06F 11/0772; G06F 11/3414; G06F 11/3692
See application file for complete search history.

(56) References Cited

U.S. PATENT DOCUMENTS

| 7,599,922 B1 | 10/2009 | Chen et al. |
| 10,083,191 B2 | 9/2018 | Barbas |

(Continued)

OTHER PUBLICATIONS

List of IBM Patents or Patent Applications Treated as Related, Jul. 19, 2023, pp. 1-2.

(Continued)

*Primary Examiner* — Hang Pan
(74) *Attorney, Agent, or Firm* — Shackelford, McKinley & Norton, LLP; Robert A. Voigt, Jr.

(57) ABSTRACT

A computer-implemented method, system and computer program product for optimally performing stress testing against big data management systems. A set of random test queries is generated and compiled to determine the data points of the features (e.g., table type being queried) of the set of random test queries. A distance (e.g., Mahalanobis distance) is then measured between the data points of the features and the mean of a distribution of data points corresponding to each same feature of an extracted feature set. Each random test query whose distance exceeds a threshold distance is then ranked. The ranked random test queries are then executed in order of rank. Those executed random test queries which resulted in an error (e.g., system failure) are added to a log, which is used to identify those queries to perform a stress test against the big data management system.

20 Claims, 8 Drawing Sheets

(51) Int. Cl.
  *G06F 11/34* (2006.01)
  *G06F 11/36* (2006.01)

(56) References Cited

U.S. PATENT DOCUMENTS

| | | |
|---|---|---|
| 10,140,336 B1 | 11/2018 | Gu et al. |
| 10,176,022 B2 | 1/2019 | Altman et al. |
| 10,318,412 B1 | 6/2019 | McKearney, Jr. et al. |
| 11,182,279 B1 * | 11/2021 | Hicks .................. G06F 11/3692 |
| 11,537,616 B1 * | 12/2022 | Lin ........................ G06N 20/00 |
| 2003/0120630 A1 | 6/2003 | Tunkelang |
| 2006/0026116 A1 | 2/2006 | Day et al. |
| 2018/0089271 A1 | 3/2018 | Kosuru et al. |
| 2019/0087311 A1 | 3/2019 | Donaldson et al. |
| 2020/0193552 A1 * | 6/2020 | Turkelson .............. G06N 20/20 |
| 2020/0364223 A1 | 11/2020 | Pal et al. |
| 2021/0064515 A1 | 3/2021 | Xu et al. |
| 2022/0138826 A1 * | 5/2022 | Wang ..................... G06N 5/025 |
| | | 705/26.63 |

OTHER PUBLICATIONS

Lachmann et al., "System-Level Test Case Prioritization Using Machine Learning," 15th IEEE International Conference on Machine Learning and Applications (ICMLA), Anaheim, CA, U.S.A., Dec. 18-20, 2016, pp. 361-368.

Spieker et al., "Reinforcement Learning for Automatic Test Case Prioritization and Selection in Continuous Integration," ISSTA'17, Santa Barbara, CA, U.S.A., Jul. 2017, arXiv:1811.04122v1, pp. 1-12.

* cited by examiner

WORKLOAD GENERATION FOR OPTIMAL STRESS TESTING OF BIG DATA MANAGEMENT SYSTEMS

TECHNICAL FIELD

The present disclosure relates generally to stress testing, and more particularly to generating workloads for optimal stress testing of big data management systems.

BACKGROUND

In testing database management systems, a stress test refers to tests that put a greater emphasis on reliability, resiliency and stability under a heavy load/stress condition, rather than on what would be considered correct behavior under normal circumstances. In particular, the goals of such tests may be to ensure the database management system does not crash in conditions of insufficient computational resources (such as memory or disk space), unusually high concurrency, or denial of service attacks.

SUMMARY

In one embodiment of the present disclosure, a computer-implemented method for optimally performing stress testing against big data management systems comprises measuring a distance between data points of features of a set of random test queries. The method further comprises ranking each random test query whose distance exceeds a threshold distance. The method additionally comprises executing the ranked random test queries in order of rank. Furthermore, the method comprises adding those executed ranked random test queries which resulted in an error in a log. Additionally, the method comprises identifying queries to perform a stress test against a big data management system based on the log.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
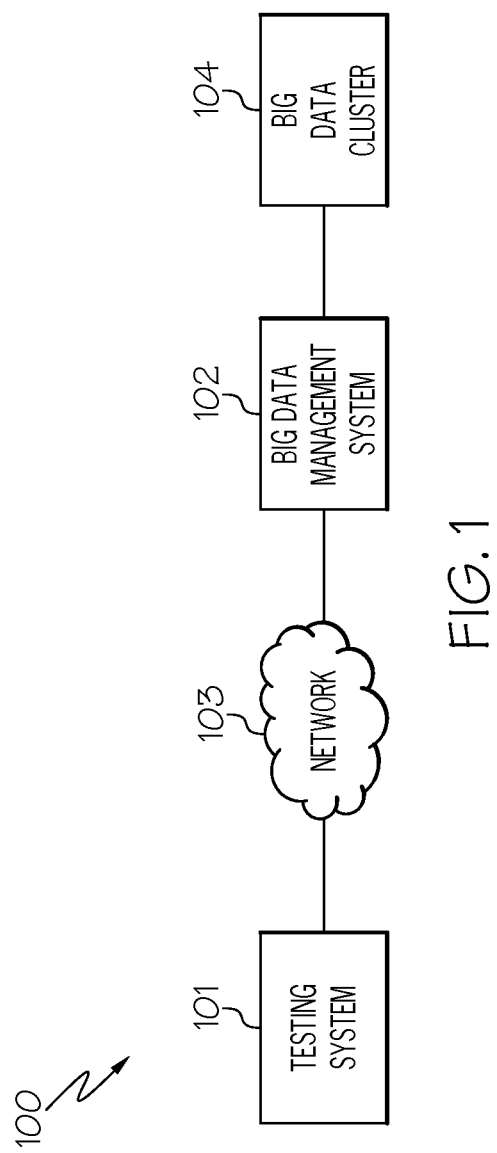
FIG. 1 illustrates a communication system for practicing the principles of the present disclosure in accordance with an embodiment of the present disclosure.

As stated in the Background section, in testing database management systems, a stress test refers to tests that put a greater emphasis on reliability, resiliency and stability under a heavy load/stress condition, rather than on what would be considered correct behavior under normal circumstances. In particular, the goals of such tests may be to ensure the database management system does not crash in conditions of insufficient computational resources (such as memory or disk space), unusually high concurrency, or denial of service attacks.

Stress testing database management systems is generally performed by workloads (e.g., structure query language (SQL) workloads) in three dimensions: concurrency (number of simultaneous query executing clients), duration (duration of continuous workload execution) and complexity (complexity of queries executed).

Typically, a test workload suite (collection of workloads intended to test a database management system by simulating a real-world situation to identify incorrect behavior, such as software errors) may execute various queries (e.g., SQL statements) to test the database management system, such as in order to identify failing SQL statements due to a code defect in a particular feature of the database system. Many of the queries may execute for many hours (e.g., 12 hours) with a successful completion thereby providing little value in terms of identifying software errors while consuming valuable test and system resources.

Stress testing database management systems has been a challenge in terms of generation of data, population of database objects and generation of complex queries (e.g., complex SQL queries) to provide in-depth quality assurance (QA) test coverage (proportion of software that is being tested) to effectively test database management system software from a system/runtime perspective.

For example, with respect to generating queries to stress test database management systems, such queries need to be complex enough to test the system for reliability, resiliency and stability while not being so complex that it takes many hours to execute the query.

Moreover, with the transition from traditional online transaction processing (OLTP)/online analytical processing (OLAP) systems to big data clusters (clusters of containers, including a data store (e.g., Hadoop® distributed file system) to store big data) managed by a big data management system (e.g., IBM® DB2® Big SQL), the amount of data the tests need to execute against has become larger by orders of magnitude which led to the number of test queries that can be executed within a 24 hour period going down considerably. "Big data," as used herein, refers to data sets with sizes beyond the ability of commonly used software tools to capture, curate, manage and process within a tolerable elapsed time.

As a result, stress testing against big data management systems do not have the luxury of running thousands of complex queries over a protracted period of time to test the reliability, resiliency and stability of the database management system software. Consequently, there is not currently a means for stress testing against big data management systems that optimally uses the available time and resources without compromising the quality of the stress test.

The embodiments of the present disclosure provide a means for identifying an optimal set of queries to be used in the stress test against big data management systems (e.g., IBM® DB2® Big SQL) that makes optimal use of the available time and resources without compromising the quality of the stress test.

In some embodiments of the present disclosure, the present disclosure comprises a computer-implemented method, system and computer program product for optimally performing stress testing against big data management systems. In one embodiment of the present disclosure, a set of random test queries is generated. "Test queries," as used herein, refer to queries that are used to test a big data management system by simulating a real-world situation to identify incorrect behavior, such as failing SQL statements due to a code defect in a particular feature of the database system. In one embodiment, such random test queries are generated based on utilizing a table containing fields to include in the test queries. The set of random test queries is then compiled to extract access plan characteristics to determine the data points of the features (e.g., column types, table type being queried, access plan operator type) of the set of random test queries. "Features," as used herein, refer to the characteristics of the queries, such as column types, table type being queried, access plan operator type, total cost of complexity divided into timeron (cost estimate based on an evaluation of the resources that will be used) buckets, temporary table usage, last statistics, etc. An "access plan," as used herein, refers to specifying an order of operations for accessing data. "Access plan characteristics," as used herein, refer to the characteristics of such an access plan. A distance (e.g., Mahalanobis distance, Euclidean distance) is then measured between the data points of the features of the set of random test queries and the mean of a distribution of data points corresponding to each same feature of an extracted feature set. In one embodiment, a feature set is extracted from an optimizer plan and the target table metadata, where the mean of the distribution of data points corresponding to each feature of the extracted feature set is measured. An "optimizer plan," as used herein, refers to the output of an optimizer that describes the optimum method of execution. The "target table metadata," as used herein, refers to the metadata (data about data) that provides the data definitions for the source data that is being consumed, including query time stats. Each random test query whose distance exceeds a threshold distance is then ranked. The ranked random test queries are then executed in order of rank. Those executed random test queries which resulted in an error (e.g., error was identified, such as a system failure) are added to a log, which is used to identify those queries to perform a stress test against the big data management system. In this manner, an optimal set of queries to be used in the stress test against big data management systems (e.g., IBM® DB2® Big SQL) that makes optimal use of the available time and resources without compromising the quality of the stress test is identified.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a testing system 101 connected to a big data management system 102 via a network 103.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

Testing system 101 is configured to perform system testing on big data management system 102 to evaluate the system's compliance with its specified requirements. In one embodiment, such system testing includes "stress testing." "Stress testing," as used herein, refers to a collection of workloads produced by testing system 101 that each include queries (e.g., structured query language (SQL) queries) to be executed by big data management system 102 in order to test big data management system 102 in terms of reliability, resiliency and stability under a heavy load/stress condition. In one embodiment, such tests are executed against big data cluster 104 (connected to big data management system 102) that is managed by big data management system 102 (e.g., IBM® DB2® Big SQL). In one embodiment, big data management system 102 includes a SQL engine, which corresponds to software that recognizes and interprets SQL commands to access big data cluster 104 and interrogate data.

In one embodiment, testing system 101 generates an optimal set of queries (e.g., SQL queries) to be executed against big data cluster 104 managed by big data management system 102 which makes optimal use of available time and resources without compromising the quality of the stress time. A more detailed description of generating such an optimal set of queries is provided further below. Furthermore, a description of the software components of testing system 101 is provided below in connection with FIG. 2 and a description of the hardware configuration of testing system 101 is provided further below in connection with FIG. 3.

Big data management system 102 is configured to interact with end users, applications, databases and big data cluster 104 to capture and analyze the data. A big data cluster 104, as used herein, refers to clusters of containers, including a data store (e.g., Hadoop® distributed file system) to store big data. "Big data," as used herein, refers to data sets with sizes beyond the ability of commonly used software tools to capture, curate, manage and process within a tolerable elapsed time.

In one embodiment, queries include a class of queries that is enabled to query a data store, such as a Hadoop® distributed file system, using familiar SQL queries. Such queries are referred to herein as "SQL-on-Hadoop." It is noted for clarity that when the term "queries" is used herein, that such queries not only include traditional queries, such as SQL queries, but also queries for executing SQL statements in a Hadoop® environment, such as SQL-on-Hadoop queries.

System 100 is not to be limited in scope to any one particular network architecture. System 100 may include any number of testing systems 101, big data management systems 102, networks 103 and big data clusters 104.

A discussion regarding the software components used by testing system 101 to identify an optimal set of queries to be used in the stress test against big data management system 102 which makes optimal use of the available time and resources without compromising the quality of the stress test is provided below in connection with FIG. 2.

Figure 2:
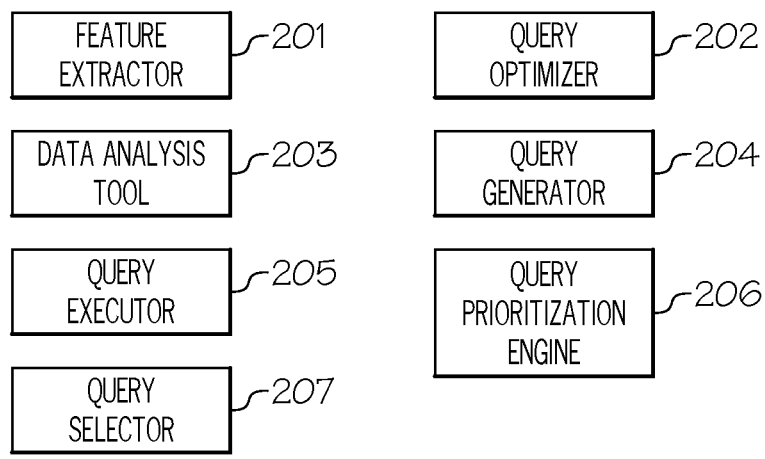
FIG. 2 is a diagram of the software components of a testing system used to identify an optimal set of queries to be used in the stress test against a big data management system that makes optimal use of the available time and resources without compromising the quality of the stress test in accordance with an embodiment of the present disclosure.

FIG. 2 is a diagram of the software components of testing system 101 (FIG. 1) used to identify an optimal set of queries to be used in the stress test against big data management system 102 that makes optimal use of the available time and resources without compromising the quality of the stress test in accordance with an embodiment of the present disclosure.

Referring to FIG. 2, in conjunction with FIG. 1, testing system 101 includes feature extractor 201 configured to identify data points (e.g., column types, table type being queried, access plan operator type) corresponding to features extracted from successful queries of a training workload, an access plan/optimizer plan and environment metadata. "Features," as used herein, refer to the characteristics of the queries, such as column types, table type being queried, access plan operator type, total cost of complexity divided into timeron (cost estimate based on an evaluation of the resources that will be used) buckets, temporary table usage, last statistics, etc. In this manner, the characteristics of queries get transformed as features of a data set.

A "successful query," as used herein, refers to a query executed by big data management system 102 that does not result in an error or failure (e.g., software error). A "workload," as used herein, refers to a big data management system's 102 ability to handle and process work. A "training workload," as used herein, refers to a workload that is used to determine which queries are optimal in performing stress testing on big data management system 102, where "optimal queries" refer to those queries that make optimal use of the available time and resources without compromising the quality of the stress test. In one embodiment, features from successful queries of a training workload are extracted by feature extractor 201, such as column types, table type being queried, access plan operator type, total cost of complexity divided into timeron buckets, temporary table usage, last statistics, etc.

An "optimizer plan" as used herein, refers to the output of an optimizer 202 (query optimizer) of testing system 101 that describes the optimum method of execution. Such an "output" may be referred to herein as an "execution plan" as well as an "optimizer plan" or an "access plan." A query optimizer 202, as used herein, refers to built-in-software that determines the most efficient way to execute a query, such as a SQL statement. In one embodiment, query optimizer 202 generates a set of potential plans for the SQL statement based on available access paths and hints. Query optimizer 202 estimates the cost of each plan based on statistics in the data dictionary. Statistics include information on the data distribution and storage characteristics of the tables, indexes and partitions accessed by the statement. In one embodiment, the cost is an estimated value proportional to the expected resource use needed to execute the statement with a particular plan. In one embodiment, query optimizer 202 calculates the cost of access paths and join orders based on the estimated computer resources (e.g., input/output, processing unit, memory, etc.). Serial plans with higher costs take longer to execute than those with smaller costs. When using a parallel plan, resource use is not directly related to elapsed time.

In one embodiment, query optimizer 202 compares the plans and chooses the plan with the lowest cost. The output of such an analysis is the "execution plan" or "optimizer plan" or "access plan" which describes the optimum method of execution. For example, the plan shows the combination of steps used to execute a SQL statement.

In one embodiment, in the optimizer plan, the query characteristics (e.g., column types, table type being queried, access plan operator type, total cost of complexity divided into timeron buckets, temporary table usage, last statistics, etc.) are included. Such features are extracted by feature extractor 201.

Furthermore, features may be extracted from the "environment metadata," which describes characteristics of the overall system, such as base location (contains the tables), data platform, SQL toolkit location, etc. as well as the query time stats. Such features, such as the query time stats, are extracted by feature extractor 201.

Additionally, in one embodiment, feature extractor 201 is configured to extract a feature set from the optimizer plan and the target table metadata. The "target table," as used herein, refers to the place where the data is going to or the table that an action is taking place on. The "target table metadata," as used herein, refers to the metadata (data about data) that provides the data definitions for the source data that is being consumed, including query time stats. Such features are extracted from the target table metadata by feature extractor 201.

In one embodiment, feature extractor 201 utilizes natural language processing to identify the features to be extracted. In one embodiment, feature extractor 201 extracts such features discussed above by identifying keywords which indicate such features, where such keywords are listed in a data structure (e.g., table). In one embodiment, such a data structure is stored in a storage device of testing system 101 (e.g., memory, disk drive).

In one embodiment, feature extractor 201 is configured to fetch an access plan of a SQL statement and translate the fetched access plan to a set of features it contains.

Testing system 101 further includes a data analysis tool 203 configured to determine the mean of a distribution of data points corresponding to a feature. For example, feature extractor 201 extracts the data points for the column types, table type being queried, access plan operator type, total cost of complexity divided into timeron buckets, temporary table usage, last statistics, etc. Such data points may be analyzed by data analysis tool 203 to derive the mean of the distribution of the data set.

Furthermore, in one embodiment, data analysis tool 203 is configured to measure the distance between the data points corresponding to each feature obtained from the extraction of the access plan characteristics of the queries of a test suite and the mean of the distribution of data points corresponding to each such feature. In one embodiment, such a distance corresponds to a multivariate distance, such as a Euclidean distance. In one embodiment, data analysis tool 203 measures the Mahalanobis distance between the data points corresponding to each feature obtained from the execution of queries of a test suite and the mean of the distribution of data points corresponding to each such feature. A "test suite" or a "test workload suite," as used herein, refers to a collection of workloads (includes queries) intended to test a big data management system by simulating a real-world situation to identify incorrect behavior, such as failing SQL statements due to a code defect in a particular feature of the database system.

Furthermore, in one embodiment, data analysis tool 203 is configured to set the furthest distance between the data point corresponding to a feature (e.g., access plan operator type) and the mean of the distribution of data points of the feature as a "threshold distance" for such a feature. Such a threshold will be used to identify queries that may possibly be utilized to perform the stress test against big data management system 102 as discussed further below.

Examples of software tools utilized by data analysis tool 203 to determine the mean of a distribution of data points corresponding to a feature include, but not limited to, Minitab®, IBM® SPSS Statistics, RStudio®, OriginPro®, EViews®, etc.

Testing system 101 additionally includes a query generator 204 configured to generate a set of random test queries. "Test queries," as used herein, refer to queries that are used to test a big data management system (e.g., big data management system 102) by simulating a real-world situation to identify incorrect behavior, such as failing SQL statements due to a code defect in a particular feature of the database system. In one embodiment, such random test queries are generated based on utilizing a table containing fields to include in the test queries. In one embodiment, such fields are populated by an expert. In one embodiment, such a table corresponds to a data structure that resides within a storage device (e.g., memory, disk drive) of testing system 101. In one embodiment, queries are randomly generated by query generator 204 by randomly selecting fields from the table discussed above to be included in each query of the set of random test queries. In one embodiment, each of the random test queries has the same number of fields. In one embodiment, criteria (e.g., union query) is added to the fields by an expert.

In one embodiment, query generator 204 generates the set of random test queries via the specification by example (SBE) method that allows query generator 204 to create queries based on an example entity instance. For example, a representative test query can be submitted to query generator 204 which, in turn, may identify "similar" queries stored in a large database using the SBE method. In one embodiment, such a search is based on comparing query vectors. In such an embodiment, queries may be represented as vectors of identifiers (such as index terms) using a vector space model.

Furthermore, testing system 101 includes a query executor 205 configured to execute or compile the queries. Furthermore, in one embodiment, query executor 205 is configured to compile the set of random test queries to extract the access plan characteristics, which are used by feature extractor 201 to determine the data points of the features (e.g., column types, access plan operator) as discussed above. An "access plan," as used herein, refers to specifying an order of operations for accessing data. For example, the access plan allows one to view statistics for selected tables, indexes or columns; properties for operators; global information, such as table space and function statistics; and configuration parameters relevant to optimization. "Access plan characteristics," as used herein, refer to the characteristics of such an access plan. As previously discussed, feature extractor 201 is configured to extract the query characteristics from the optimizer plan or access plan, which contain the query characteristics.

Examples of software tools utilized by query executor 205 to compile the set of random test queries include, but not limited to, Microsoft® SQL server management studio (SSMS), SQLGate®, Postico, PopSQL®, Adminer Editor, Valentina, DBeaver®, SQuirreL SQL, etc.

Additionally, testing system 101 includes a query prioritization engine 206 configured to prioritize queries, such as those random test queries whose distance (distance between a data point of a feature and the mean of the distribution of data points corresponding to such a feature) exceeds a threshold distance. In one embodiment, such prioritization involves ranking the random test queries, such as based on expected runtime duration. In one embodiment, the runtime duration is predicted using a decision tree, where the decision tree includes variables and the elements of the variables include the features as discussed further below. Furthermore, in one embodiment, the variables include characteristics of a query, such as a table type, an operator, an interrupt, a column type, table metadata, etc.

In one embodiment, query prioritization engine 206 ranks the random test queries based on a weight assigned to each of the random test queries as discussed further below. In one embodiment, such a weight is determined by a solution of a linear system.

Furthermore, testing system 101 includes a query selector 207 configured to identify and select an optimal set of queries (e.g., SQL queries) to be executed against big data cluster 104 managed by big data management system 102 to perform stress testing, where such queries make optimal use of available time and resources without compromising the quality of the stress test. In one embodiment, such an optimal set of queries corresponds to those ranked random test queries that when executed resulted in an error. In one embodiment, such queries that resulted in an error when executed are stored in a log (referred to herein as the "test log").

A further description of these and other functions is provided below in connection with the discussion of the method for optimally performing stress testing against big data management systems.

Prior to the discussion of the method for optimally performing stress testing against big data management systems, a description of the hardware configuration of testing system 101 (FIG. 1) is provided below in connection with FIG. 3.

Figure 3:
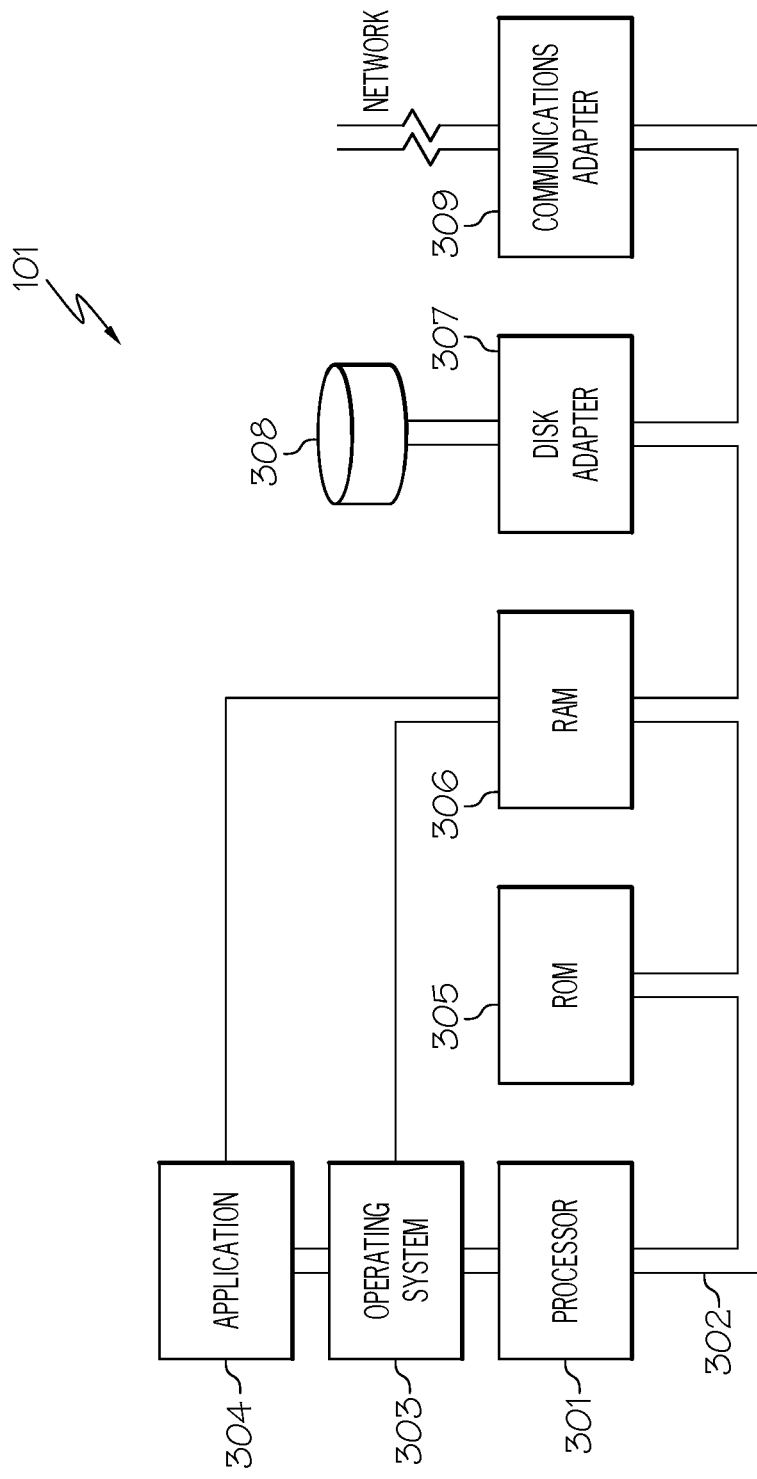
FIG. 3 illustrates an embodiment of the present disclosure of the hardware configuration of the testing system which is representative of a hardware environment for practicing the present disclosure.

Referring now to FIG. 3, in conjunction with FIGS. 1-2, FIG. 3 illustrates an embodiment of the present disclosure of the hardware configuration of testing system 101 (FIG. 1) which is representative of a hardware environment for practicing the present disclosure.

Testing system 101 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, feature extractor 201, query optimizer 202, data analysis tool 203, query generator 204, query executor 205, query prioritization engine 206 and query selector 207. Furthermore, application 304 may include, for example, a program for generating an optimal set of queries (e.g., SQL queries) to be executed against big data cluster 104 managed by big data management system 102 which makes optimal use of available time and resources without compromising the quality of the stress time as discussed further below in connection with FIGS. 4A-4B and 5-7.

Referring again to FIG. 3, read-only memory ("ROM") 305 is connected to system bus 302 and includes a basic input/output system ("BIOS") that controls certain basic functions of testing system 101. Random access memory ("RAM") 306 and disk adapter 307 are also connected to system bus 302. It should be noted that software components including operating system 303 and application 304 may be loaded into RAM 306, which may be testing system's 101 main memory for execution. Disk adapter 307 may be an integrated drive electronics ("IDE") adapter that communicates with a disk unit 308, e.g., disk drive. It is noted that the program for generating an optimal set of queries (e.g., SQL queries) to be executed against big data cluster 104 managed by big data management system 102 which makes optimal use of available time and resources without compromising the quality of the stress time, as discussed further below in connection with FIGS. 4A-4B and 5-7, may reside in disk unit 308 or in application 304.

Testing system 101 may further include a communications adapter 309 connected to bus 302. Communications adapter 309 interconnects bus 302 with an outside network (e.g., network 103 of FIG. 1) to communicate with other devices, such as big data management system 102.

In one embodiment, application 304 of testing system 101 includes the software components of feature extractor 201, query optimizer 202, data analysis tool 203, query generator 204, query executor 205, query prioritization engine 206 and query selector 207. In one embodiment, such components may be implemented in hardware, where such hardware components would be connected to bus 302. The functions discussed above performed by such components are not generic computer functions. As a result, testing system 101 is a particular machine that is the result of implementing specific, non-generic computer functions.

In one embodiment, the functionality of such software components (e.g., feature extractor 201, query optimizer 202, data analysis tool 203, query generator 204, query executor 205, query prioritization engine 206 and query selector 207) of testing system 101, including the functionality for generating an optimal set of queries (e.g., SQL queries) to be executed against big data cluster 104 managed by big data management system 102 which makes optimal use of available time and resources without compromising the quality of the stress time, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, stress testing database management systems has been a challenge in terms of generation of data, population of database objects and generation of complex queries (e.g., complex SQL queries) to provide in-depth quality assurance (QA) test coverage (proportion of software that is being tested) to effectively test database management system software from a system/runtime perspective. For example, with respect to generating queries to stress test database management systems, such queries need to be complex enough to test the system for reliability, resiliency and stability while not being so complex that it takes many hours to execute the query. Moreover, with the transition from traditional online transaction processing (OLTP)/online analytical processing (OLAP) systems to big data clusters (clusters of containers, including a data store (e.g., Hadoop® distributed file system) to store big data) managed by a database management system (e.g., IBM® DB2® Big SQL), the amount of data the tests need to execute against has become larger by orders of magnitude which led to the number of test queries that can be executed within a 24 hour period going down considerably. "Big data," as used herein, refers to data sets with sizes beyond the ability of commonly used software tools to capture, curate, manage and process within a tolerable elapsed time. As a result, stress testing against big data management systems do not have the luxury of running thousands of complex queries over a protracted period of time to test the reliability, resiliency and stability of the database management system software. Consequently, there is not currently a means for stress testing against big data management systems that optimally uses the available time and resources without compromising the quality of the stress test.

Figure 4A:
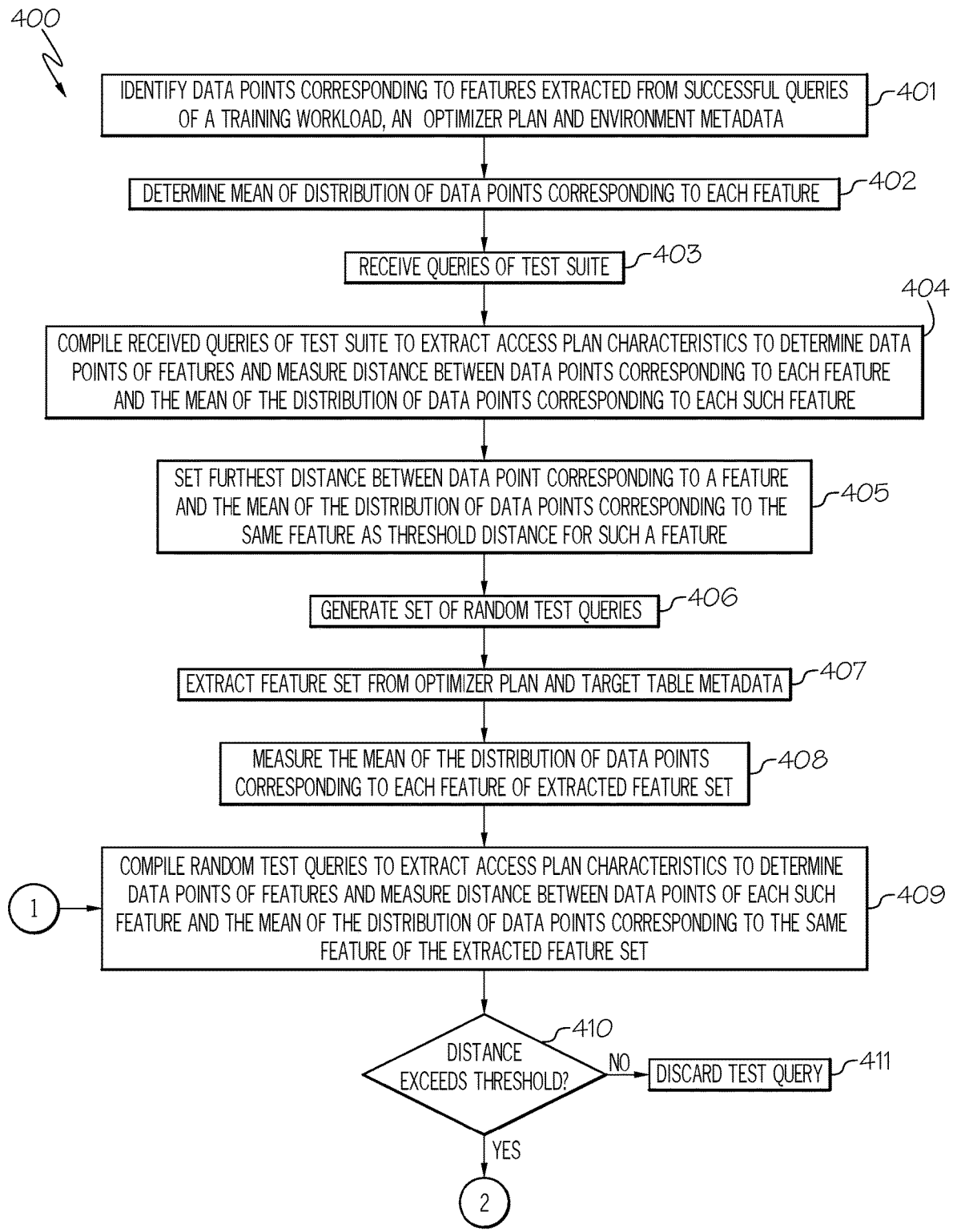
FIGS. 4A-4B are a flowchart of a method for optimally performing stress testing against big data management systems in accordance with an embodiment of the present disclosure.
Figure 4B:
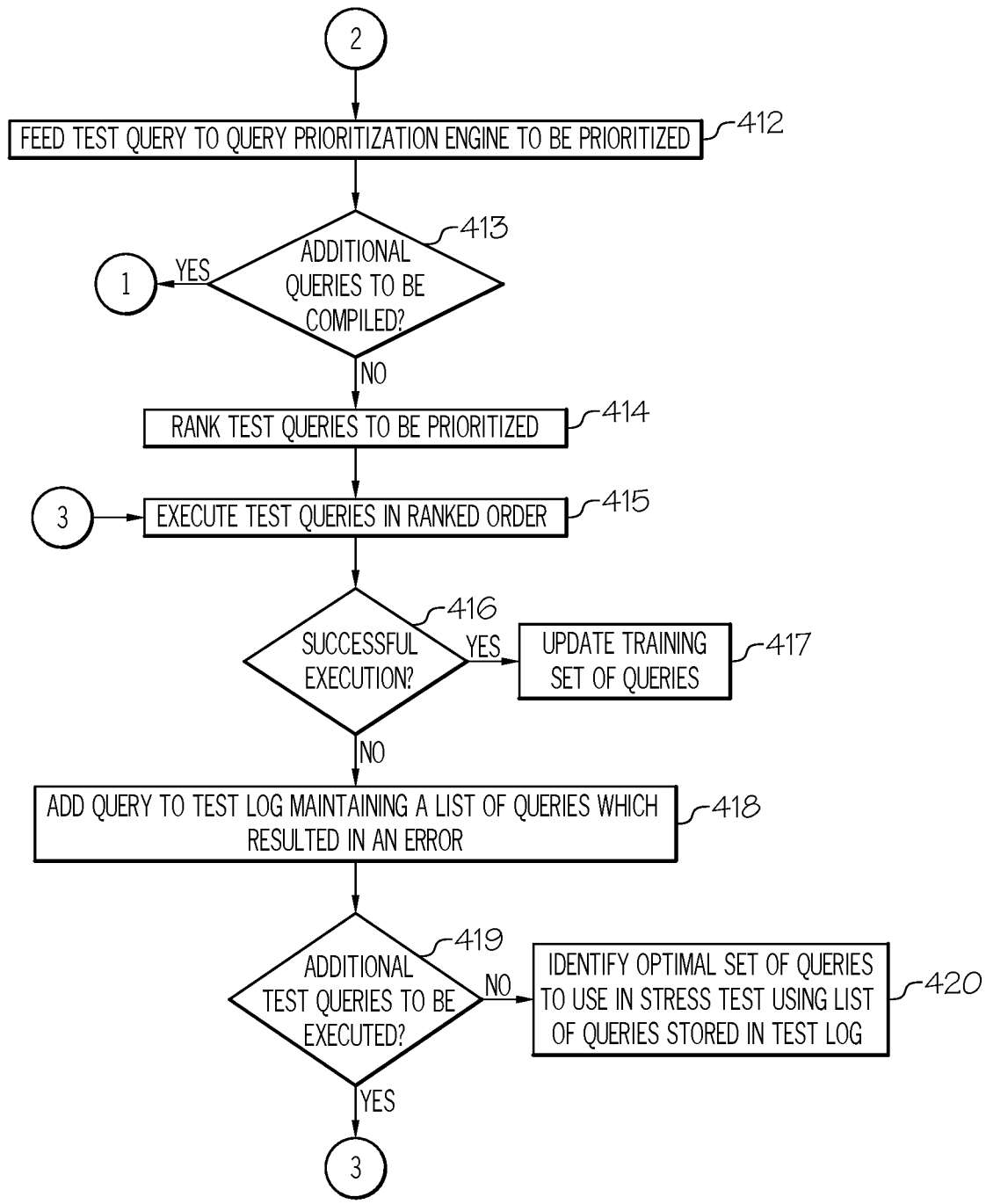
Figure 5:
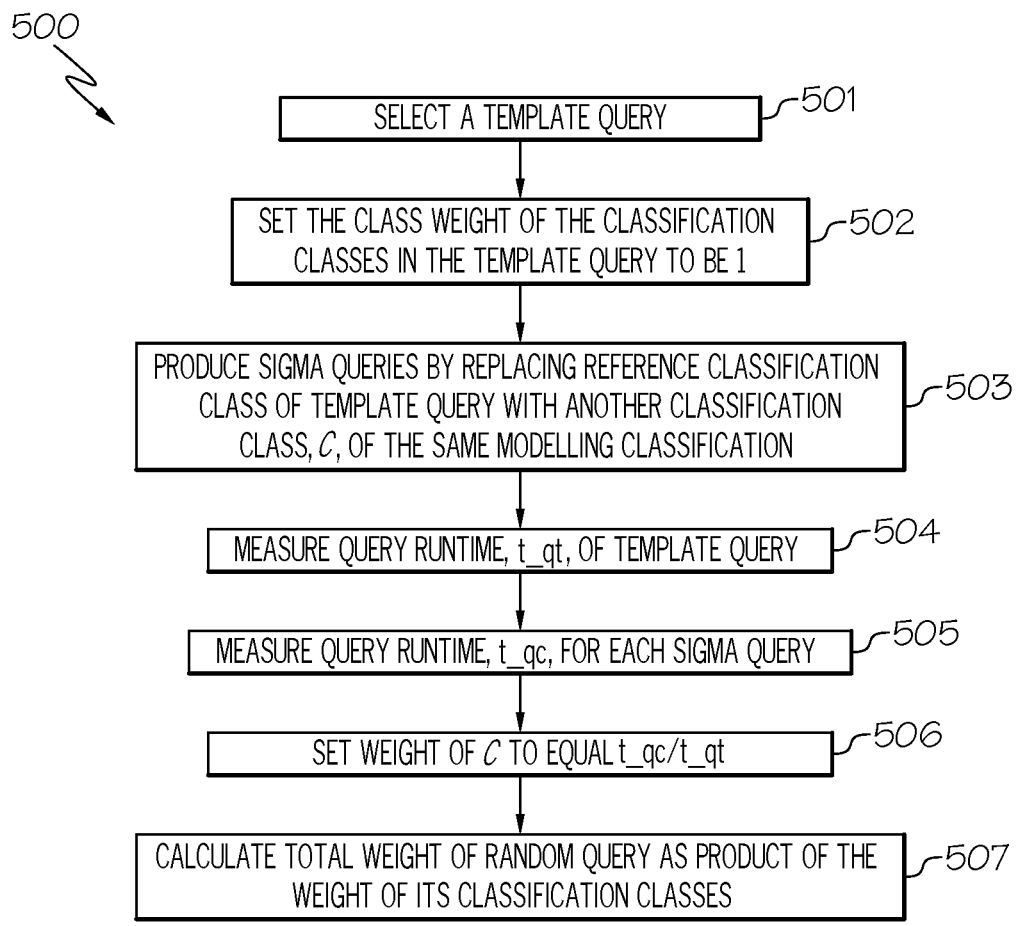
FIG. 5 is a flowchart of a method for calculating a weight of the random test query in accordance with an embodiment of the present disclosure.
Figure 6:
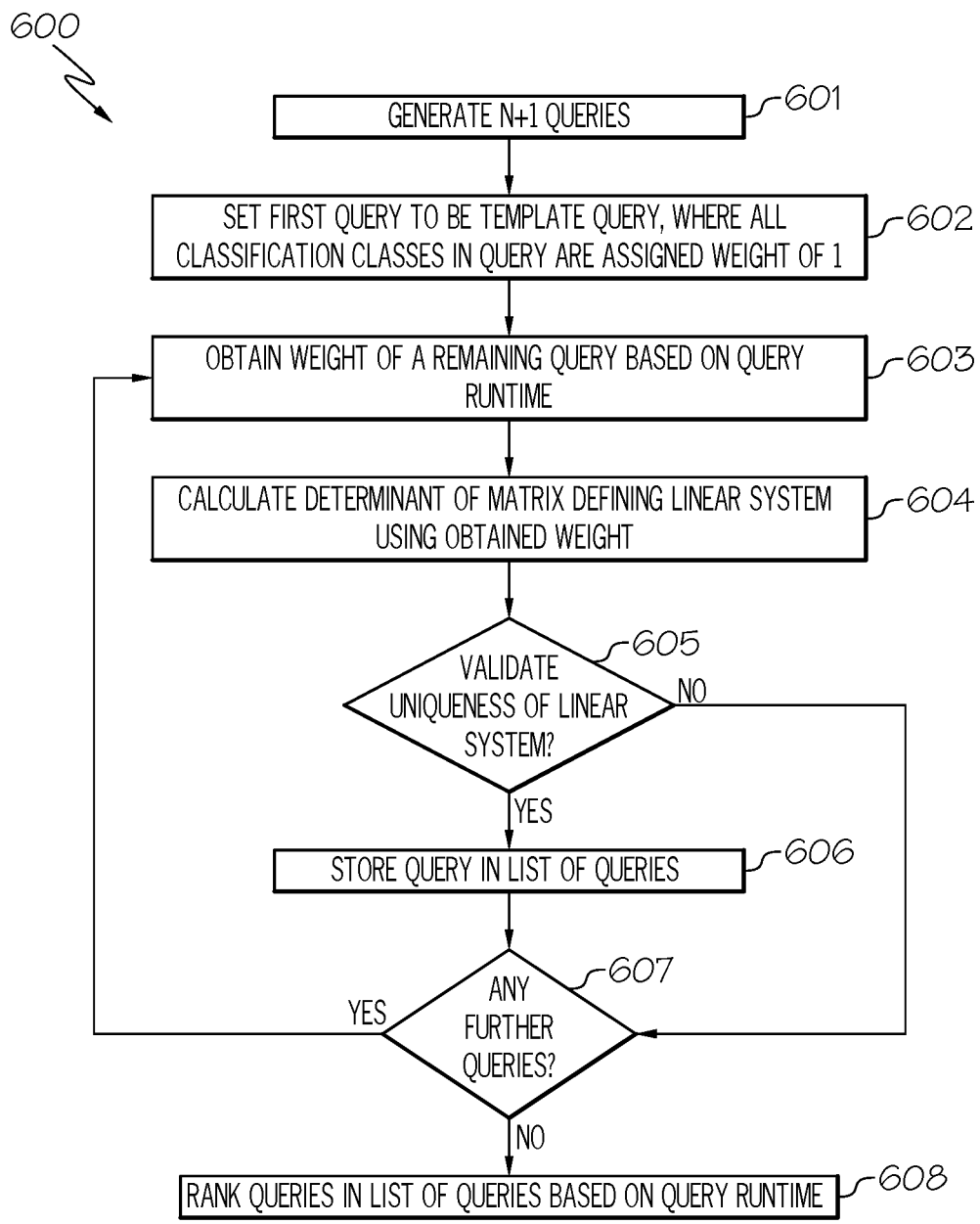
FIG. 6 is a flowchart of a method for ranking random test queries whose distance exceeds a threshold distance based on weights assigned to the test queries in accordance with an embodiment of the present disclosure.
Figure 7:
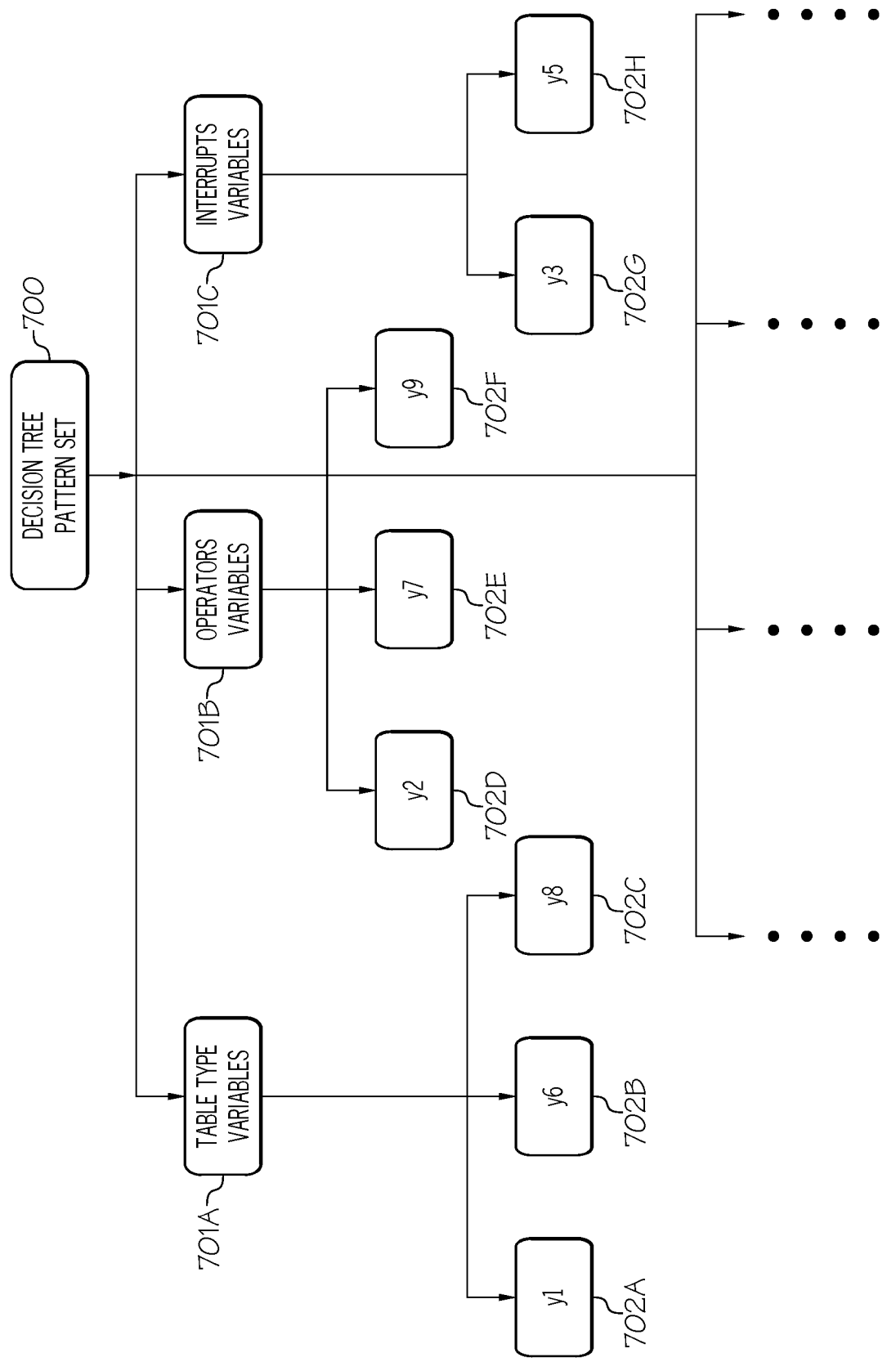
FIG. 7 illustrates an exemplary decision tree in accordance with an embodiment of the present disclosure.

The embodiments of the present disclosure provide a means for identifying an optimal set of queries to be used in the stress test against big data management systems (e.g., IBM® DB2® Big SQL) that makes optimal use of the available time and resources without compromising the quality of the stress test as discussed below in connection with FIGS. 4A-4B and 5-7. FIGS. 4A-4B are a flowchart of a method for optimally performing stress testing against big data management systems. FIG. 5 is a flowchart of a method for calculating a weight of the random test query. FIG. 6 is a flowchart of a method for ranking random test queries whose distance exceeds a threshold distance based on weights assigned to the test queries. FIG. 7 illustrates an exemplary decision tree.

As stated above, FIGS. 4A-4B are a flowchart of a method 400 for optimally performing stress testing against big data management systems in accordance with an embodiment of the present disclosure.

Referring to FIG. 4A, in conjunction with FIGS. 1-3, in step 401, feature extractor 201 of testing system 101 identifies the data points (e.g., column types, table type being queried, access plan operator type) corresponding to features extracted from successful queries of a training workload, an optimizer plan and environment metadata.

As discussed above, "features," as used herein, refer to the characteristics of the queries, such as column types, table type being queried, access plan operator type, total cost of complexity divided into timeron (cost estimate based on an evaluation of the resources that will be used) buckets, temporary table usage, last statistics, etc. A "successful query," as used herein, refers to a query executed by big data management system 102 that does not result in an error or failure (e.g., software error). A "workload," as used herein, refers to big data management system's 102 ability to handle and process work. A "training workload," as used herein, refers to a workload that is used to determine which queries are optimal in performing stress testing on big data management system 102, where "optimal queries" refer to those queries that make optimal use of the available time and resources without compromising the quality of the stress test. In one embodiment, features from success queries of a training workload are extracted by feature extractor 201, such as column types, table type being queried, access plan operator type, total cost of complexity divided into timeron buckets, temporary table usage, last statistics, etc.

An "optimizer plan" as used herein, refers to the output of an optimizer 202 (query optimizer) that describes the optimum method of execution. Such an "output" may be referred to herein as an "execution plan" as well as an "optimizer plan" or an "access plan." A query optimizer 202, as used herein, refers to built-in-software that determines the most efficient way to execute a query, such as a SQL statement. In one embodiment, query optimizer 202 generates a set of potential plans for the SQL statement based on available access paths and hints. Query optimizer 202 estimates the cost of each plan based on statistics in the data dictionary. Statistics include information on the data distribution and storage characteristics of the tables, indexes and partitions accessed by the statement. In one embodiment, the cost is an estimated value proportional to the expected resource use needed to execute the statement with a particular plan. In one embodiment, query optimizer 202 calculates the cost of access paths and join orders based on the estimated computer resources (e.g., input/output, processing unit, memory, etc.). Serial plans with higher costs take longer to execute than those with smaller costs. When using a parallel plan, resource use is not directly related to elapsed time.

In one embodiment, query optimizer 202 compares the plans and chooses the plan with the lowest cost. The output of such an analysis is the "execution plan" or "optimizer plan" or "access plan" which describes the optimum method of execution. For example, the plan shows the combination of steps used to execute a SQL statement.

In one embodiment, in the optimizer plan, the query characteristics (e.g., column types, table type being queried, access plan operator type, total cost of complexity divided into timeron buckets, temporary table usage, last statistics, etc.) are included. Such features are extracted by feature extractor 201.

Furthermore, features may be extracted from the "environment metadata," which describes characteristics of the overall system, such as base location (contains the tables), data platform, SQL toolkit location, etc. as well as the query time stats. Such features, such as the query time stats, are extracted by feature extractor 201.

Additionally, in one embodiment, feature extractor 201 is configured to extract a feature set from the optimizer plan and the target table metadata. The "target table," as used herein, refers to the place where the data is going to or the table that an action is taking place on. The "target table metadata," as used herein, refers to the metadata (data about data) that provides the data definitions for the source data that is being consumed, including query time stats.

In one embodiment, feature extractor 201 utilizes natural language processing to identify the features to be extracted. In one embodiment, feature extractor 201 extracts such features discussed above by identifying keywords which indicate such features, where such keywords are listed in a data structure (e.g., table). In one embodiment, such a data structure is stored in a storage device of testing system 101 (e.g., memory 305, disk drive 308).

In one embodiment, feature extractor 201 is configured to fetch an access plan of a SQL statement and translate the fetched access plan to a set of features it contains.

In step 402, data analysis tool 203 of testing system 101 determines the mean of a distribution of data points corresponding to each feature. For example, feature extractor 201 extracts the data points for the column types, table type being queried, access plan operator type, total cost of complexity divided into timeron buckets, temporary table usage, last statistics, etc. Such data points may be analyzed by data analysis tool 203 to derive the mean of the distribution of the data set.

As stated above, examples of software tools utilized by data analysis tool 203 to determine the mean of a distribution of data points corresponding to a feature include, but not limited to, Minitab®, IBM® SPSS Statistics, RStudio®, OriginPro®, EViews®, etc.

In step 403, testing system 101 receives queries of a test suite, such as from an expert. A "test suite" or a "test workload suite," as used herein, refers to a collection of workloads (includes queries) intended to test a big data management system by simulating a real-world situation to identify incorrect behavior, such as failing SQL statements due to a code defect in a particular feature of the database system In step 404, query executor 205 of testing system 101 compiles the received queries of the test suite to extract the access plan characteristics, which is used by feature extractor 201 to determine the data points of the features (e.g., column types, table type being queried, access plan operator type), where data analysis tool 203 of testing system 101 measures the distance between the data points corresponding to each feature obtained from the compilation of the queries of a test suite and the mean of the distribution of data points corresponding to each such feature (determined in step 402).

In one embodiment, data analysis tool 203 measures the multivariate distance (e.g., Mahalanobis distance, Euclidean distance) between the data points corresponding to each feature obtained from the compilation of the queries of a test suite and the mean of the distribution of data points corresponding to each such feature.

As stated above, examples of software tools utilized by query executor 205 to compile the set of random test queries include, but not limited to, Microsoft® SQL server management studio (SSMS), SQLGate®, Postico, PopSQL®, Adminer Editor, Valentina, DBeaver®, SQuirreL SQL, etc.

In step 405, data analysis tool 203 of testing system 101 sets the furthest distance between the data point corresponding to a feature (data point of the feature of the executed query of the test suite) and the mean of the distribution of data points of the feature as the "threshold distance" for such a feature. Such a threshold will be used to identify queries that may possibly be utilized to perform the stress test against big data management system 102. For instance, such a threshold distance is used to identify outlier queries that have a high probability of precipitating a query or system failure as discussed further below.

In step 406, query generator 204 of testing system 101 generates a set of random test queries. As stated above, "test queries," as used herein, refer to queries that are used to test a big data management system (e.g., big data management system 102) by simulating a real-world situation to identify incorrect behavior, such as failing SQL statements due to a code defect in a particular feature of the database system. In one embodiment, such random test queries are generated based on utilizing a table containing fields to include in the test queries. In one embodiment, such fields are populated by an expert. In one embodiment, such a table corresponds to a data structure that resides within a storage device (e.g., memory 305, disk drive 308) of testing system 101. In one embodiment, queries are randomly generated by query generator 204 by randomly selecting fields from the table discussed above to be included in each query of the set of random test queries. In one embodiment, each of the random test queries has the same number of fields. In one embodiment, criteria (e.g., union query) is added to the fields by an expert.

In one embodiment, query generator 204 generates the set of random test queries via the specification by example (SBE) method that allows query generator 204 to create queries based on an example entity instance. For example, a representative test query can be submitted to query generator 204 which, in turn, may identify "similar" queries stored in a large database using the SBE method. In one embodiment, such a search is based on comparing query vectors. In such an embodiment, queries may be represented as vectors of identifiers (such as index terms) using a vector space model.

In step 407, feature extractor 201 of testing system 101 extracts a feature set from an optimizer plan and the target table metadata.

As discussed above, in one embodiment, in the optimizer plan, the query characteristics (e.g., column types, table type being queried, access plan operator type, total cost of complexity divided into timeron buckets, temporary table usage, last statistics, etc.) are included. Such features are extracted by feature extractor 201.

The "target table," as used herein, refers to the place where the data is going to or the table that an action is taking place on. The "target table metadata," as used herein, refers to the metadata (data about data) that provides the data definitions for the source data that is being consumed, including query time stats. Such features are extracted from the target table metadata by feature extractor 201.

In step 408, data analysis tool 203 of testing system 101 measures the mean of the distribution of data points corresponding to each feature of the extracted feature set as discussed above in connection with step 402.

In step 409, query executor 205 of testing system 101 compiles the random test queries to extract the access plan characteristics, which is used by feature extractor 201 to determine the data points of the features of the queries and then have data analysis tool 203 of testing system 101 measure the distance between the data points corresponding to each such feature (e.g., column types, table type being queried, access plan operator type) and the mean of the distribution of data points corresponding to that same feature of the extracted feature set.

In one embodiment, query executor 205 is configured to compile the set of random test queries in order for feature extractor 201 to determine the data points of the features (e.g., column types, table type being queried, access plan operator type) as previously discussed, such as in step 404.

Furthermore, data analysis tool 203 measures the distance between the data points corresponding to each such feature (e.g., column types, table type being queried, access plan operator type) and the mean of the distribution of data points corresponding to that same feature of the extracted feature set in the same manner as discussed above in connection with step 404. In one embodiment, such a distance corresponds to a multivariate distance (e.g., Mahalanobis distance, Euclidean distance).

In step 410, a determination is made by data analysis tool 203 of testing system 101 as to whether the measured distance (e.g., Mahalanobis distance for a feature, such as table type being queried) exceeds the threshold distance for such a feature (e.g., table type being queried) (determined in step 405). Such a determination is performed in order to identify queries that have a high probability of precipitating a query or system failure.

If the measured distance does not exceed the threshold distance for such a feature, then, in step 411, data analysis tool 203 of testing system 101 discards the test query. Such a query is discarded since it will provide little value in terms of stress testing. Such a query provides little value in terms of stress testing since other queries will be executed which provide similar coverage (e.g., quality assurance coverage). In other words, by discarding such queries, embodiments of the present disclosure prevent execution of similar test queries that provide little value in terms of overage.

Referring now to FIG. 4B, in conjunction with FIGS. 1-3, if, on the other hand, the measured distance exceeds the threshold distance for such a feature, then, in step 412, data analysis tool 203 of testing system 101 feeds the test query to query prioritization engine 206 to be prioritized. In one embodiment, such queries will be ranked by query prioritization engine 206 according to coverage complexity and estimated query duration.

In step 413, a determination is made by testing system 101 as to whether additional random test queries are to be compiled. If there are additional random test queries to be compiled, then query executor 205 compiles another random test query in step 409.

If, on the other hand, there are no additional random test queries to be compiled, then, in step 414, query prioritization engine 206 of testing system 101 ranks the random test queries to be prioritized.

In one embodiment, query prioritization engine 206 ranks the random test queries based on the expected runtime duration, which is predicted for a portion of the queries (predicting runtime duration of the query when it is executed against big data cluster 104 managed by big data management system 102) using a decision tree, where the decision tree includes variables and the elements of the variables include features. A discussion regarding the embodiments of query prioritization engine 206 ranking the random test queries is discussed below in connection with FIGS. 5-7.

FIG. 5 is a flowchart of a method 500 for calculating a weight of the random test query in accordance with an embodiment of the present disclosure.

In one embodiment, query prioritization engine 206 uses a runtime duration of a few selected random test queries in order to predict a runtime duration for the other queries. In one embodiment, a decision tree is utilized to make such a prediction. In one embodiment, the design of the decision tree is based on the functional specification of a particular query. For modelling classification, the input domain is divided into mutually exclusive subsets (so called classification classes). In the decision tree definition, queries are defined by combining classification classes from different classifications. In one embodiment, since classifications only contain mutually exclusive features, queries cannot contain multiple features of one classification.

"Classification classes," as used herein, are also called "variables" (e.g., table type being queried, operators, interrupts, etc.) and their elements are called "features" (e.g., Apache® Parquet, TEMP operation, UNION operation, limit N rows, etc.). A "query," as discussed herein, represents a set of n features, one for each variable. The query runtime prediction and query prioritization are used to determine the smallest possible subset of queries that covers all combinations of features specified by a coverage metric with at least one query.

Classification classes are utilized as there is a strong correlation between the characteristics of a query (e.g., SQL query) and the code path it executes on the software of the big data management system. As a result, controlling the key characteristics (features) of the query also means controlling what part of the software code of the big data management system gets exercised.

Examples of key characteristics of a query, such as the SQL-on-Hadoop query, that get transformed as features of a data set include the following: table type (strong correlation among table type as different table types call a different SQL engine input/output reader to process and cover a different code path), operators (SQL query plan operators determine the precise steps to execute the query, where each operator covers a different functionality within the runtime engine), interrupts, column types (row operations, predicate filtering and other low level functionality is dependent on the column types making it highly correlated to SQL query execution and quality assurance coverage), environment/table metadata (partitioning data as well as cardinality of tables affects the runtime coverage and is an indicator of query complexity), total cost of complexity and temporary table usage (key indicators of complexity and coverage for optimizer plan are correlated with the level of quality assurance coverage), etc.

The design of such a decision tree is discussed below in connection with FIG. 5.

Referring to FIG. 5, in conjunction with FIGS. 1-3 and 4A-4B, in step 501, query prioritization engine 206 of testing system 101 selects a template query. For example, the query containing features y1, y2 and y3, where, e.g., y1="Relational," y2="GRPBY" and y3="Fetch first N rows," is selected. In one embodiment, query prioritization engine 206 selects a template query among a set of template queries stored in a data structure (e.g., table) populated by an expert. In one embodiment, the data structure is stored in a storage device (e.g., memory 305, disk drive 308) of testing system 101. Such template queries are designed to include the features that most queries that are utilized to perform stress testing of a big data management system contain.

In step 502, query prioritization engine 206 of testing system 101 sets the class weight of the classification classes (variables) in the template query to be 1. For example, query prioritization engine 206 sets the class weight (cw) of the classification classes in the template query to be 1: y1 (cw=1), y2 (cw=1), and y3 (cw=1). A "class weight," as used herein, refers to a value that indicates the importance of a classification class. For example, the higher the class weight, the greater importance is that classification class. In one embodiment, the class weight is normalized between the values of 0 and 1.

In step 503, query prioritization engine 206 of testing system 101 produces queries (referred to herein as the "sigma queries") by replacing the reference classification class of the template query with another classification class, c, of the same modelling classification. For example, the reference classification class (e.g., y3) is replaced by another classification class (e.g., y4) of the same modelling classification (e.g., σc) which produces sigma σ queries (e.g., δY2=(y1, y2, y4)).

In step 504, query prioritization engine 206 of testing system 101 measures the query runtime, t_qt, of the template query. In one embodiment, query prioritization engine 206 utilizes any of the following tools to measure the query runtime, such as SolarWinds® Database Performance Analyzer, AppOptics™ APM, ManageEngine® Applications Manager, Redgate® SQL Monitor, EverSQL, Idera® DB Optimizer, dbForge Studio, etc.

In step 505, query prioritization engine 206 of testing system 101 measures the query runtime, t_qc, for each sigma query, σc (e.g., δY2=(y1, y2, y4)). As discussed above, in one embodiment, query prioritization engine 206 utilizes any of the following tools to measure the query runtime, such as SolarWinds® Database Performance Analyzer, AppOptics™ APM, ManageEngine® Applications Manager, Redgate® SQL Monitor, EverSQL, Idera® DB Optimizer, dbForge Studio, etc.

In step 506, query prioritization engine 206 of testing system 101 sets the weight of c to equal t_qc/t_qt. For example, if t_qt=4 s and t_Y2 (t_qc)=8 s, then the weight of y4 is cw=2.

In step 507, query prioritization engine 206 of testing system 101 calculates the total weight of the random query as the product of the weight of its classification classes. As a result, queries can be prioritized based on their total weights.

In one embodiment, the calculation of the weights is determined by the solution of a linear system with N=("total classification classes"–"total modelling classifications") solutions. In one embodiment, such N solutions correspond to the weights of the classification classes outside the reference classification classes. A discussion regarding calculating the weights in such a manner is provided below in connection with FIG. 6.

FIG. 6 is a flowchart of a method 600 for ranking random test queries whose distance exceeds a threshold distance based on weights assigned to the test queries in accordance with an embodiment of the present disclosure.

Referring to FIG. 6, in conjunction with FIGS. 1-3 and 4A-4B, in step 601, query generator 204 of testing system 101 generates N+1 queries.

In one embodiment, such queries are generated by query generator 204 based on utilizing a table containing fields to include in the queries. In one embodiment, such fields are populated by an expert. In one embodiment, such a table corresponds to a data structure that resides within a storage device (e.g., memory 305, disk drive 308) of testing system 101. In one embodiment, queries are generated by query generator 204 by randomly selecting fields from the table discussed above to be included in each query of the N+1 queries. In one embodiment, each of the queries has the same number of fields. In one embodiment, criteria (e.g., union query) is added to the fields by an expert.

In one embodiment, query generator 204 generates the N+1 queries via the specification by example (SBE) method that allows query generator 204 to create queries based on an example entity instance. For example, a representative test query can be submitted to query generator 204 which, in turn, may identify "similar" queries stored in a large database using the SBE method. In one embodiment, such a search is based on comparing query vectors. In such an embodiment, queries may be represented as vectors of identifiers (such as index terms) using a vector space model.

Examples of software tools utilized by query generator 204 to generate queries include, but not limited to, Microsoft® SQL server management studio (SSMS), SQL-Gate®, Postico, PopSQL®, Adminer Editor, Valentina, DBeaver®, SQuirreL SQL, etc.

In step 602, query prioritization engine 206 of testing system 101 sets the first query to be the template query, where all classification classes in the query are assigned the weight of 1.

In step 603, query prioritization engine 206 of testing system 101 obtains the weight of a remaining query based on its query runtime (query runtime of the remaining query). In one embodiment, the lower the query runtime, the higher the weight. As discussed above, in one embodiment, query prioritization engine 206 utilizes any of the following tools to measure the query runtime, such as SolarWinds® Database Performance Analyzer, AppOptics™ APM, ManageEngine® Applications Manager, Redgate® SQL Monitor, EverSQL, Idera® DB Optimizer, dbForge Studio, etc.

In step 604, query prioritization engine 206 of testing system 101 calculates the determinant of the matrix defining the linear system using the objected weight as discussed further below in connection with FIG. 7.

In step 605, a determination is made by query prioritization engine 206 of testing system 101 as to whether the uniqueness of the linear system was validated as discussed further below in connection with FIG. 7.

If the uniqueness of the linear system was validated, then, in step 606, query prioritization engine 206 of testing system 101 stores the query in a list of queries. In one embodiment, such a list corresponds to a data structure (e.g., table) saved in a storage device (e.g., memory 305, disk drive 308) of testing system 101.

If, however, the uniqueness of the linear system was not validated or upon storing the query in the list of queries, in step 607, a determination is made by query prioritization engine 206 of testing system 101 as to whether there are any further queries to be analyzed.

If there are further queries to be analyzed, then query prioritization engine 206 obtains the weight of the next remaining query based on its query runtime in step 603.

If, however, there are no further queries to be analyzed, then, in step 608, query prioritization engine 206 of testing system 101 ranks the queries in the list of queries based on the query runtime. For example, queries with a smaller runtime duration are ranked higher than queries with a larger runtime duration.

As an example, and turning now to FIG. 7, which illustrates an exemplary decision tree in accordance with an embodiment of the present disclosure, the decision tree pattern set 700 includes a layer of classification classes (variables) 701A-701C (identified as "table type variables," "operators variables," and "interrupts variables," respectively). Classification classes 701A-701C may collectively or individually be referred to as classification classes 701 or classification class 701, respectively.

Furthermore, as shown in FIG. 7, each classification class 701 may include one or more elements (features). For example, classification class 701A includes elements y1 702A, y6 702B and y8 702C. Classification class 701B includes elements y2 702D, y7 702E and y9 702F. Furthermore, classification class 701C includes elements y3 702G and y5 702H.

Referring to FIG. 7, in conjunction with FIG. 6, the decision tree of FIG. 7 implies the following: the first $6=(8-3)+1$ queries (assuming N=5 in generating N+1 queries) in the all-pairs permutation sequence set are given by: QR=(y1, y2, y3), Q1=(y1, y4, y5), Q2=(y6, y2, y5), Q3=(y6, y4, y3), Q4=(y8, y9, y3), and Q5=(y8, y4, y5).

In one embodiment, the class weight (cw) for y1 is given by cw_y1, the class weight (cw) for y2 is given by cw_y2, and so on, and all the classification classes in this query are assigned the weight of 1, e.g., (cw_y1=cw_y2=cw_y3)=1. Next, and by considering query runtimes as t_QR, t_Q1, t_Q5, Q1 obtains the weight (cw_y1*cw_y2*cw_y3)= (t_Q1/t_QR), and so on. In order to solve the linear system in the exponential form, and by taking into consideration that (cw_y1=cw_y2=cw_y3)=1, the following equations are obtained: log(cw_y4)+log(cw_y5)=log(t_Q1/t_QR) and so on. The linear system is then defined by the following matrix:

$$[\begin{array}{c} 00101 \mid \log(t\_Q1/t\_QR) \\ 10001 \mid \log(t\_Q2/t\_QR) \\ 10100 \mid \log(t\_Q3/t\_QR) \\ 01010 \mid \log(t\_Q4/t\_QR) \\ 01100 \mid \log(t\_Q5/t\_QR) \end{array}]$$

The calculated determinant of the matrix on the right-hand side is 2. As a result, the uniqueness of the linear system solution is validated. For example, measuring runtimes as t_QR=1 s, t_Q1=2 s, t_Q2=109 s, t_Q3=12 s, t_Q4=82 s, and t_Q5=60 s, the same results as above for the weights are predicted. Prioritization of queries is then achieved from the smallest query runtime value to the highest query runtime value.

Consequently, as per quality assurance (QA) coverage permitting, the queries can be executed from the smallest query runtime to the highest query runtime.

Furthermore, as illustrated in FIG. 7, runtime durations are predicted based on the importance of the classification tree elements (i.e., the weights of the selected test cases). The weights are calculated via the linear system as discussed above.

Returning to FIG. 4B, in conjunction with FIGS. 1-3 and 5-7, in step 415, query executor 205 of testing system 101 executes the test queries in order of rank. Examples of software tools utilized by query executor 205 to execute queries include, but not limited to, Microsoft® SQL server management studio (SSMS), SQLGate®, Postico, PopSQL®, Adminer Editor, Valentina, DBeaver®, SQuirreL SQL, etc. The following steps discuss the execution of one of such test queries.

In step 416, a determination is made by query executor 205 of testing system 101 as to whether the execution of the test query was successful (i.e., an error was not identified, such as a system failure).

If the execution of the test query was successful, then, in step 417, query executor 205 of testing system 101 updates the training set of queries. Such a training set is updated to reflect that no error was identified and is used to influence future query generation. As discussed above, the principles of the present disclosure are directed to generating an optimal set of queries to test big data management system 102 that have a high probability of precipitating a query or system failure while optimizing the use of available time and resources. As a result, those test queries that are successful are less likely to be utilized in a subsequent generated set of random test queries.

If, however, the execution of the test query was not successful (i.e., an error was identified, such as a system failure), then, in step 418, query executor 205 of testing system 101 adds the query to a log (referred to herein as the "test log") maintaining a list of queries which resulted in an error. Such a list of queries include those queries with a high probability of forcing an error, such as a system or query failure.

In step 419, a determination is made by query executor 205 of testing system 101 as to whether additional test queries need to be executed. If additional test queries need to be executed, then query executor 205 of testing system 101 executes the next test query in order of rank in step 415.

If, however, there are no additional test queries to be executed, then, in step 420, query selector 207 of testing system 101 identifies the optimal set of queries to perform the stress test against big data management system 102 using the list of queries stored in the test log. As previously discussed, the test log includes a list of queries with a high probability of forcing an error upon big data management system 102 executing such a query against big data cluster 104.

By limiting the number of queries to perform stress testing against big data management systems, such as utilizing those queries with a high probability of forcing errors, time and resources are optimally used without compromising the quality of the stress test.

In this manner, an optimal set of queries is identified to be used in the stress test against big data management systems (e.g., IBM® DB2® Big SQL) that makes optimal use of the available time and resources without compromising the quality of the stress test.

As a result of the foregoing, embodiments of the present disclosure generate a set of outlier queries that have a high probability of precipitating a query or system failure. Furthermore, embodiments of the present disclosure predict the runtime duration of each outlier query and prioritize the execution so that the shortest running queries can run first thereby optimizing the use of the available time and resources.

Furthermore, the principles of the present disclosure improve the technology or technical field involving stress testing. As discussed above, stress testing database management systems has been a challenge in terms of generation of data, population of database objects and generation of complex queries (e.g., complex SQL queries) to provide in-depth quality assurance (QA) test coverage (proportion of software that is being tested) to effectively test database management system software from a system/runtime perspective. For example, with respect to generating queries to stress test database management systems, such queries need to be complex enough to test the system for reliability, resiliency and stability while not being so complex that it takes many hours to execute the query. Moreover, with the transition from traditional online transaction processing (OLTP)/online analytical processing (OLAP) systems to big data clusters (clusters of containers, including a data store (e.g., Hadoop® distributed file system) to store big data) managed by a database management system (e.g., IBM® DB2® Big SQL), the amount of data the tests need to execute against has become larger by orders of magnitude which led to the number of test queries that can be executed within a 24 hour period going down considerably. "Big data," as used herein, refers to data sets with sizes beyond the ability of commonly used software tools to capture, curate, manage and process within a tolerable elapsed time. As a result, stress testing against big data management systems do not have the luxury of running thousands of complex queries over a protracted period of time to test the reliability, resiliency and stability of the database management system software. Consequently, there is not currently a means for stress testing against big data management systems that optimally uses the available time and resources without compromising the quality of the stress test.

Embodiments of the present disclosure improve such technology by generating a set of random test queries. "Test queries," as used herein, refer to queries that are used to test a big data management system by simulating a real-world situation to identify incorrect behavior, such as failing SQL statements due to a code defect in a particular feature of the database system. In one embodiment, such random test queries are generated based on utilizing a table containing fields to include in the test queries. The set of random test queries is then compiled to extract access plan characteristics to determine the data points of the features (e.g., column types, table type being queried, access plan operator type) of the set of random test queries. An "access plan," as used herein, refers to specifying an order of operations for accessing data. "Access plan characteristics," as used herein, refer to the characteristics of such an access plan. "Features," as used herein, refer to the characteristics of the queries, such as column types, table type being queried, access plan operator type, total cost of complexity divided into timeron (cost estimate based on an evaluation of the resources that will be used) buckets, temporary table usage, last statistics, etc. A distance (e.g., Mahalanobis distance, Euclidean distance) is then measured between the data points of the features of the set of random test queries and the mean of a distribution of data points corresponding to each same feature of an extracted feature set. In one embodiment, a feature set is extracted from an optimizer plan and the target table metadata, where the mean of the distribution of data points corresponding to each feature of the extracted feature set is measured. An "optimizer plan," as used herein, refers to the output of an optimizer that describes the optimum method of execution. The "target table metadata," as used herein, refers to the metadata (data about data) that provides the data definitions for the source data that is being consumed, including query time stats. Each random test query whose distance exceeds a threshold distance is then ranked. The ranked random test queries are then executed in order of rank. Those executed random test queries which resulted in an error (e.g., error was identified, such as a system failure) are added to a log, which is used to identify those queries to perform a stress test against the big data management system. In this manner, an optimal set of queries to be used in the stress test against big data management systems (e.g., IBM® DB2® Big SQL) that makes optimal use of the available time and resources without compromising the quality of the stress test is identified. Furthermore, in this manner, there is an improvement in the technical field involving stress testing.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for optimally performing stress testing against big data management systems, the method comprising:
   measuring a distance between data points of features of a set of random test queries;
   ranking each random test query whose distance exceeds a threshold distance;
   executing said ranked random test queries in order of rank;
   adding those executed ranked random test queries which resulted in an error in a log; and
   identifying queries based on said log;
   executing said identified queries to perform a stress test against a big data management system.

2. The method as recited in claim 1, wherein each of said random test queries whose distance exceeds said threshold distance is ranked based on expected runtime duration.

3. The method as recited in claim 2, wherein said runtime duration is predicted using a decision tree, wherein said decision tree comprises variables, wherein elements of said variables comprise features.

4. The method as recited in claim 3, wherein said variables comprise one or more characteristics of a query selected from the group consisting of: a table type, an operator, an interrupt, a column type, and table metadata.

5. The method as recited in claim 1, wherein each of said random test queries whose distance exceeds said threshold distance is ranked based on a weight assigned to each of said random test queries whose distance exceeds said threshold distance, wherein said weight is determined by a solution of a linear system.

6. The method as recited in claim 1 further comprising:
compiling said set of random test queries to extract access plan characteristics to determine said data points of features of said set of random test queries; and
measuring said distance between said data points of features of said set of random test queries and a mean of a distribution of data points corresponding to each same feature of an extracted feature set.

7. The method as recited in claim 1, wherein said distance comprises a Mahalanobis distance.

8. A computer program product for optimally performing stress testing against big data management systems, the computer program product comprising one or more computer readable storage mediums having program code embodied therewith, the program code comprising programming instructions for:
measuring a distance between data points of features of a set of random test queries;
ranking each random test query whose distance exceeds a threshold distance;
executing said ranked random test queries in order of rank;
adding those executed ranked random test queries which resulted in an error in a log;
identifying queries based on said log; and
executing said identified queries to perform a stress test against a big data management system.

9. The computer program product as recited in claim 8, wherein each of said random test queries whose distance exceeds said threshold distance is ranked based on expected runtime duration.

10. The computer program product as recited in claim 9, wherein said runtime duration is predicted using a decision tree, wherein said decision tree comprises variables, wherein elements of said variables comprise features.

11. The computer program product as recited in claim 10, wherein said variables comprise one or more characteristics of a query selected from the group consisting of: a table type, an operator, an interrupt, a column type, and table metadata.

12. The computer program product as recited in claim 8, wherein each of said random test queries whose distance exceeds said threshold distance is ranked based on a weight assigned to each of said random test queries whose distance exceeds said threshold distance, wherein said weight is determined by a solution of a linear system.

13. The computer program product as recited in claim 8, wherein the program code further comprises the programming instructions for:
compiling said set of random test queries to extract access plan characteristics to determine said data points of features of said set of random test queries; and
measuring said distance between said data points of features of said set of random test queries and a mean of a distribution of data points corresponding to each same feature of an extracted feature set.

14. The computer program product as recited in claim 8, wherein said distance comprises a Mahalanobis distance.

15. A system, comprising: a memory for storing a computer program for optimally performing stress testing against big data management systems; and a processor connected to said memory, wherein said processor is configured to execute program instructions of the computer program comprising:
measuring a distance between data points of features of a set of random test queries;
ranking each random test query whose distance exceeds a threshold distance;
executing said ranked random test queries in order of rank;
adding those executed ranked random test queries which resulted in an error in a log;
identifying queries based on said log; and
executing said identified queries to perform a stress test against a big data management system.

16. The system as recited in claim 15, wherein each of said random test queries whose distance exceeds said threshold distance is ranked based on expected runtime duration.

17. The system as recited in claim 16, wherein said runtime duration is predicted using a decision tree, wherein said decision tree comprises variables, wherein elements of said variables comprise features.

18. The system as recited in claim 17, wherein said variables comprise one or more characteristics of a query selected from the group consisting of: a table type, an operator, an interrupt, a column type, and table metadata.

19. The system as recited in claim 15, wherein each of said random test queries whose distance exceeds said threshold distance is ranked based on a weight assigned to each of said random test queries whose distance exceeds said threshold distance, wherein said weight is determined by a solution of a linear system.

20. The system as recited in claim 15, wherein the program instructions of the computer program further comprise:
compiling said set of random test queries to extract access plan characteristics to determine said data points of features of said set of random test queries; and
measuring said distance between said data points of features of said set of random test queries and a mean of a distribution of data points corresponding to each same feature of an extracted feature set.

* * * * *